United States Patent [19]

Yamaguchi et al.

[11] Patent Number: 4,544,601
[45] Date of Patent: Oct. 1, 1985

[54] MAGNETIC RECORDING MEDIUM

[75] Inventors: Nobutaka Yamaguchi; Shinobu Iida; Toshimitu Okutu; Takahito Miyoshi; Eiichi Tadokoro; Masaaki Fujiyama, all of Kanagawa, Japan

[73] Assignee: Fuji Photo Film Co., Ltd., Japan

[21] Appl. No.: 586,919

[22] Filed: Mar. 7, 1984

[30] Foreign Application Priority Data

Mar. 7, 1983 [JP] Japan ................... 58-36906

[51] Int. Cl.$^4$ .............................................. G11B 5/72
[52] U.S. Cl. ................................. 428/330; 360/134; 360/135; 360/136; 427/128; 427/131; 428/323; 428/336; 428/403; 428/407; 428/694; 428/695; 428/900; 428/408
[58] Field of Search ............... 428/403, 407, 694, 695, 428/408, 900, 323, 330, 336; 427/94, 130, 131, 128; 360/134–136

[56] References Cited

U.S. PATENT DOCUMENTS

| 3,993,824 | 11/1976 | Shirahata | 428/336 |
|---|---|---|---|
| 4,091,164 | 5/1978 | Schwarz | 428/403 |
| 4,135,031 | 1/1979 | Akashi | 428/900 |
| 4,135,032 | 1/1979 | Akashi | 428/330 |
| 4,200,565 | 4/1980 | Naughton | 428/403 |
| 4,310,599 | 1/1982 | Akashi | 428/694 |
| 4,367,261 | 1/1983 | Miyoshi | 428/330 |
| 4,414,270 | 11/1983 | Miyoshi | 428/900 |
| 4,418,163 | 11/1983 | Murakami | 428/407 |
| 4,419,406 | 12/1983 | Isobe | 428/694 |
| 4,451,531 | 5/1984 | Isobe | 428/694 |
| 4,452,863 | 6/1984 | Takizawa | 428/695 |
| 4,474,843 | 10/1984 | Miyoshi | 427/131 |

Primary Examiner—Ellis P. Robinson
Attorney, Agent, or Firm—Sughrue, Mion, Zinn, Macpeak, and Seas

[57] ABSTRACT

A magnetic recording medium is disclosed. The medium is comprised of a non-magnetic support having coated thereon a magnetic recording layer and a backing layer on the surface opposite the magnetic recording layer. The backing layer contains carbon black and the surface treated calcium carbonate dispersed in a binder. The calcium carbonate is surface treated so as to make the particles hydrophobic. Including the carbon black and the calcium carbonate in the backing layer provides a recording medium with improved durability and a reduced amount of drop out.

49 Claims, No Drawings

MAGNETIC RECORDING MEDIUM

FIELD OF THE INVENTION

The present invention relates to a magnetic recording medium comprising a support having provided thereon a backing layer to improve durability of the magnetic recording medium.

BACKGROUND OF THE INVENTION

A magnetic recording medium is wound at a high speed and therefore there are problems that a surface of the support opposite to a magnetic recording layer is readily electrostatically charged and also worn out. Due to the above problems, improvement in the durability of magnetic recording media is highly desired.

Hitherto, the improvement in durability of magnetic recording media has been achieved by providing a backing layer and carbon black is incorporated into the backing layer to prevent static charging and calcium carbonate is added to the backing layer to adjust unevenness of the surface thereof, as disclosed in Japanese Patent Publication No. 8321/74.

However, in the above conventional method, calcium carbonate does not have sufficient affinity with respect to binders and therefore, it can be easily scraped away from the backing layer, causing drop out. Thus satisfactory durability cannot be obtained.

SUMMARY OF THE INVENTION

An object of the invention is to provide a magnetic recording medium having improved durability of the coated film of backing layer and having reduced drop out.

More specifically, the present invention relates to a magnetic recording medium comprising a non-magnetic support having coated thereon a magnetic recording layer and a backing layer on the surface opposite to the magnetic recording layer, the backing layer containing (1) carbon black and (2) surface-treated calcium carbonate.

DETAILED DESCRIPTION OF THE INVENTION

An average particle size of carbon black used in the backing layer according to the present invention is not particularly limited, but is preferably about 10 to about 150 μm, more preferably 30 to 120 mμ and most preferably 50 to 100 mμ. Smaller average particle size tends to give rise to more decreased durability of the backing layer. When the average particle size is larger than about 150 mμ, surface unevenness of the backing layer increases and is transferred to the surface of the magnetic recording layer whereby electromagnetic properties are often deteriorated.

Calcium carbonate used in the present invention is a surface-treated calcium carbonate where the surface of calcium carbonate is made hydrophobic, whereby calcium carbonate is easily wetted with an organic solvent and is easily dispersed therein. When calcium carbonate is dispersed in a binder, the affinity of calcium carbonate for the binder increases and thus the strength of the coated backing layer increases.

Agents which can be used for surface treatment of calcium carbonate used in the present invention include natural surfactants such as saponin, lecithin and resin acid, with lecithin and resin acid being preferred; nonionic surfactants such as alkylene oxides, glycerols and glicidols, with alkylene oxides being preferred; cationic surfactants such as higher alkylamines, quaternary ammonium salts and heterocyclic compounds, e.g., pyridine, phosphonium and sulfonium compounds, with quaternary ammonium salts being preferred; anionic surfactants having an acidic group such as carboxylic acid group, sulfonic acid group, phosphoric acid group, a sulfate group or a phosphate group, with those having a carboxylic acid group of a sulfonic acid group being preferred; and amphoteric surfactants such as amino acids, amino sulfonic acids, and sulfates or phosphates of amino-alcohols, with amino acids being preferred. Particularly preferred surfactant is resin acid.

A high molecular weight resin being a polar group can also be used as the surface-treating agent. A vinyl chloride-vinyl acetate copolymer having —COOH and/or —OH and nitrocellulose are preferred. Of these, the former is particularly preferred.

Lignin whose chemical structure is unclear and which is a main component of wood is also useful as the surface-treating agent.

The surface treating agent can be used in an amount of about 0.001 to about 10 parts by weight, preferably 0.05 to 5 parts by weight and more preferably 0.1 to 3 parts by weight based on 100 parts by weight of calcium carbonate.

Any organic solvents conventionally employed in magnetic recording medium can be used as a solvent for the surface treating agent. Water is also useful for this purpose. Examples of preferred solvent include polar solvents such as ketones, acetic acid esters, alcohols, water, etc. Of these, ketones such as methyl ethyl ketone and methyl isobutyl ketone are particularly preferred.

Surface treatment of calcium carbonate with the surface treating agent can be carried out at a temperature of about 5° C. to about 80° C., preferably 10° C. to 50° C., for about 30 minutes to about 3 days, preferably 30 minutes to 10 hours, using a conventional mixer or blender which can be employed in preparing magnetic recording media.

The average particle size of the calcium carbonate used in the present invention is about 10μ or less, preferably 0.01 to 5μ and more preferably 0.05 to 1μ. The amount of calcium carbonate added to the backing layer is about 1 to about 500 parts by weight, preferably 5 to 200 parts by weight and more preferably 10 to 100 parts by weight based on 100 parts by weight of the binder. The mixing ratio (by weight) of calcium carbonate to carbon black is 5:95 to 95:5, preferably 10:90 to 90:10 and more preferably 30:70 to 70:30. Generally, when the proportion of calcium carbonate is higher, the antistatic effect of the backing layer decreases to a greater extent, and when the proportion of calcium carbonate is smaller, durability of the backing layer is less improved.

Binders which can be used in the backing layer are those having a softening temperature of 150° C. or less, an average molecular weight of 10,000 to 200,000 and a polymerization degree of about 200 to 2,000. Typical examples of the binders are copolymers of vinyl chloride and vinyl acetate, copolymers of vinyl chloride and vinylidene chloride, copolymers of vinyl chloride and acrylonitrile, copolymers of acrylate and acrylonitrile, copolymers of acrylate and vinylidene chloride, copolymers of acrylate and styrene, copolymers of methacrylate and acrylonitrile, copolymers of methacrylate and vinylidene chloride, copolymers of methacrylate and styrene, urethane elastomers, polyvinyl fluoride, copolymers of vinylidene chloride and acrylonitrile, copolymers of butadiene and acrylonitrile, a polyamide resin, polyvinyl butyral, cellulose derivatives (cellulose acetate butyrate, cellulose diacetate, cellulose triacetate, cellulose propionate, nitrocellulose and the like), copolymers of styrene and butadiene, polyester resins, copolymers of chlorovinyl ether and acrylate, amino resins, various synthetic rubber type thermoplastic resins and the mixture thereof. Examples of preferred binders include copolymers of vinyl chloride and vinyl acetate, copolymers of vinylidene chloride and acrylonitrile, copolymers of vinyl chloride and vinylidene chloride, urethane elastomers, copolymers of acrylonitrile and butadiene and cellulose derivatives. Of these, copolymers of vinyl chloride and vinyl acetate, copolymers of vinylidene chloride and acrylonitrile, urethane elastomers and cellulose derivatives are particularly preferred.

The backing layer in the magnetic recording medium of the present invention can contain a curing agent. Curing agents which can be used in the backing layer have a molecular weight of 200,000 or less in coating compositions. After the coating composition is coated and dried, the molecular weight of the curing agent becomes infinite by a reaction such as condensation and addition reactions. Of the above described resins, the resins that are not softened or melted until they are heat-decomposed are preferred. Specific examples of the resins include phenol resins, epoxy resins, polyurethane curing type resins, ureido resins, melamine resins, alkyd resins, silicone resins, acryl type reactive resins, mixtures of a high molecular weight polyester resin and an isocyanate prepolymer, mixtures of a copolymer of methacrylate and a diisocyanate prepolymer, mixtures of polyester polyol and polyisocyanate, ureido formaldehyde resins, mixtures of a low molecular glycol/a high molecular diol/triphenyl methane triisocyanate, polyamine resins, polyisocyanates and mixtures thereof. Of these, epoxy resins, polyurethane curing type resins, alkyd resins and polyisocyanates are preferred, with polyurethane curing type resins and polyisocyanates being particularly preferred.

Other additives which can be used in the backing layer of this invention include inorganic extender pigments such as magnesium silicate, aluminum silicate, barium sulfate or clay; organic particles such as benzoguanamine; abrasives which are used in a magnetic recording layer hereinafter described such as $Cr_2O_3$, $\alpha$-$Al_2O_3$, $\alpha$-$Fe_2O_3$, SiC, garnet, etc.; surfactants or lubricants.

The support which can be used in the present invention includes polyethylene terephthalate, polyethylene naphthalate, polyamide, polyimide and vinyl chloride type films. A film which has been provided with a backing layer can also be used. Also, supports can be those having different smoothness of the surface on opposite surfaces. Further, supports having a metal layer such as aluminum layer which is provided by vapor deposition, or those having coated thereon a subbing layer can also be used. The support may be colored by, for example, carbon black.

Materials used in a magnetic recording layer, such as magnetic particles, binders, additives, etc. and methods for preparing the magnetic recording layer and the backing layer are disclosed in U.S. Pat. No. 4,135,016. The dry thickness of the backing layer is about 0.05 to about 5$\mu$, preferably 0.1 to 3$\mu$ and more preferably 0.2 to 2$\mu$.

The present invention is further illustrated in greater detail by the following Examples, but is not limited thereto. In these Examples, all parts, ratios and the like are by weight.

EXAMPLE 1

Coating composition for a magnetic recording layer:

| | |
|---|---|
| Co-modified $\gamma$-$Fe_2O_3$ (Particle size: 0.35$\mu$; acicular ratio: 1:8; coercive force: 650 Oe) | 300 parts |
| Vinyl chloride/vinyl acetate copolymer (vinyl chloride:vinyl acetate = 87:13; polymerization degree: 420) | 30 parts |
| Polyester polyurethane (synthesized from butylene adipate and 4,4'-diphenylmethane diisocyanate; molecular weight (styrene equivalent): about 130,000) | 30 parts |
| $Cr_2O_3$ | 12 parts |
| Lecithin | 6 parts |
| Liquid paraffin | 1 part |
| Dimethyl polysiloxane | 3 parts |
| Butyl acetate | 600 parts |

The above composition was dispersed in a ball mill for 48 hours. To the dispersion was added 40 parts of "Desmodule L-75" (a 75 wt% ethyl acetate solution of an adduct of 1 mole of trimethylolpropane and 3 moles of toluylene diisocyanate; solid content: 30 parts), and the mixture was dispersed for 30 minutes. The dispersion was then filtrated through a filter having an average pore size of 1$\mu$ to prepare a magnetic coating composition.

The above magnetic coating composition was coated by a doctor coating method on a polyethylene terephthalate film having a thickness of 14$\mu$ which had been provided, on the opposite surface, with a backing layer having the following composition. The magnetic layer was subjected to magnetic orientation in a machine direction and to calendering treatment. The resulting magnetic recording medium was slit into a width of ½ inch to prepare a video takpe for VHS (Sample Nos. 1 to 5).

Coating composition for a backing layer:

| | |
|---|---|
| Carbon black ("furnace black; average particle size: 90 m$\mu$) | 300 parts |
| Calcium carbonate (surface-treated product; particle size: 0.2$\mu$) | 150 parts |
| Polyisocyanate ("Desmodule L-75") | 133 parts |
| Vinyl chloride vinyl acetate copolymer (vinyl chloride:vinyl acetate = 87:13; polymerization degree: 420) | 300 parts |
| Methyl ethyl ketone | 2000 parts |
| Methyl isobutyl ketone | 2000 parts |

The above composition except for the curing agent (polyisocyanate) for the backing layer was dispersed in a ball mill for 90 hours. To the dispersion was then added the curing agent and, after adjusting the viscosity of the mixture to about 1 poise, the mixture filtrated through a filter having a pore size of 5$\mu$ and coated on the support.

A thickness of the magnetic recording layer and the backing layer was 5$\mu$ and 1.5$\mu$, respectively.

The surface treating agents used for calcium carbonate in Sample Nos. 1 to 5 are as follows.

| Sample No. | Surface Treating Agents for CaCO$_3$ |
|---|---|
| 1 | Resin acid |
| 2 | Sodium alkylbenzenesulfonate |
| 3 | Oleic acid |
| 4 | Lecithin |
| 5 | Vinyl chloride/vinyl acetate/maleic anhydride copolymer (vinyl chloride:vinyl acetate:maleic anhydride = 85:10:5; polymerization degree: 300) |

The surface treating process will be explained below with respect to Sample No. 3, but it is to be noted that other surface treating agents can be used in the same manner.

A large amount of the solvent (methyl ethyl ketone) was stirred using a high speed impeller dispersing device and calcium carbonate was gradually added thereto. After stirring for 1 hour, 3 wt% of oleic acid based on the amount of calcium carbonate was added thereto and the mixture was further stirred for 2 hours. The mixture thus obtained was dispersed by a high speed stone mill to prepare a mixture of calcium carbonate and the organic solvent which was used for a backing layer.

Selection of solvent is important and depends upon kinds of surface treating agents. When water is used as a solvent, the resulting surface-treated calcium carbonate should be dehydrated and dried to a powder before use.

COMPARATIVE EXAMPLE 1

Sample Nos. 6 to 10 were prepared in the same manner as in Example 1 except that the following composition for the backing layer was used, respectively. In Sample No. 6, carbon black was used instead of calcium carbonate in the same amount as calcium carbonate. In Sample No. 7, calcium carbonate was not surface-treated. In Sample No. 8, carbon black and calcium carbonate were not used. In Sample No. 9, calcium carbonate was not surface-treated and calcium carbonate which was not surface-treated was added instead of carbon black in the same amount as carbon black. In Sample No. 10, calcium carbonate was used instead of carbon black in the same amount as carbon black.

EXAMPLE 2

The same procedure as in Sample No. 1 of Example 1 was repeated except that carbon black having a small particle size (15 mμ) was used in the backing layer to prepare Sample No. 11.

EXAMPLE 3

The same composition as in Sample No. 5 of Example 1 was used except that 15 parts of carbon black ("furnace black" having particle size of 50 mμ) were added to the magnetic recording layer to prepare Sample No. 12.

Results of evaluations with respect to Sample Nos. 1 to 12 are shown in Table 1. Sample Nos. 1 to 5 of this invention shows less drop out and excellent durability as compared with Comparative Sample Nos. 6 to 10. As is apparent from the comparison between Sample Nos. 1 and 11, this invention is effective when carbon black having a larger particle size is used in the backing layer. It is clear from the comparison between Sample Nos. 5 and 12 that this invention is effective when carbon black is also included in the magnetic recording layer.

Of Sample Nos. 1 to 5, Sample No. 5 shows a slightly better durability than others. It is believed that such better durability is due to the strong interaction between a copolymer of vinyl chloride and vinyl acetate used in the backing layer and a copolymer of vinyl chloride, vinyl acetate and maleic acid used for surface-treating calcium carbonate.

The drop out was evaluated by mounting a tape sample on a VHS cassette and passed 200 times in a VHS type VTR at 25° C. and 30% relative humidity. Then, signals are recorded, and the drop out was indicated in terms of the number of drop out per minute which is more than 1/5 H (Horizon) and which is visually measured when the signals are replayed on a TV monitor; the smaller the number, the higher the durability of the tape.

TABLE 1

| | Sample No. | Carbon Black (mμ) | Calcium Carbonate Addition | Surface-Treating Agent | Drop Out (Number/min.) | Remarks |
|---|---|---|---|---|---|---|
| Example 1 | 1 | 90 | Added | Resin acid | 10 | |
| " | 2 | " | " | Sodium alkylbenzenesulfonate | 9 | |
| " | 3 | " | " | Oleic acid | 13 | |
| " | 4 | " | " | Lecithin | 13 | |
| " | 5 | " | " | Vinyl chloride/vinyl acetate/maleic anhydride copolymer | 6 | |
| Comparative Example 1 | 6 | " | None | — | 192 | Abrasion of backing layer was noted. |
| Comparative Example 1 | 7 | " | Added | No surface treatment | 99 | Abrasion of backing layer was noted. |
| Comparative Example 1 | 8 | No addition | None | — | 300 | Much abrasion of backing layer was noted. |
| Comparative Example 1 | 9 | " | Added | No surface treatment | 300 | Slight abrasion of backing layer was noted. |
| Comparative Example 1 | 10 | " | " | Resin acid | 300 | Slight abrasion of backing layer was noted. |
| Example 2 | 11 | 15 | " | " | 31 | |
| Example 3 | 12* | 90 | " | Vinyl chloride/vinyl acetate/maleic anhydride copolymer | 2 | *Carbon black wax included in the magnetic layer. |

What is claimed is:

1. A magnetic recording medium comprising a non-magnetic supporting having coated thereon a magnetic recording layer comprising a ferromagnetic powder and a binder and a backing layer on the surface opposite to the magnetic recording layer, said backing layer containing (1) carbon black having an average particle size in the range of about 10 m$\mu$ to about 150 m$\mu$ and (2) surface treated hydrophobic calcium carbonate.

2. A magnetic recording medium as claimed in claim 2, wherein the carbon black has an average has an average particle size in the range of 30 m$\mu$ to 120 m$\mu$.

3. A magnetic recording medium as claimed in claim 2, wherein the carbon black has an average particle size in the range of 50 m$\mu$ to 100 m$\mu$.

4. A magnetic recording medium as claimed in claim 1, wherein the calcium carbonate has an average particle size of about 10$\mu$ or less.

5. A magnetic recording medium as claimed in claim 4, wherein the calcium carbonate has an average particle size in the range of 0.01 to 5$\mu$.

6. A magnetic recording medium as claimed in claim 5, wherein the calcium carbonate has an average particle size in the range of 0.05 to 1$\mu$.

7. A magnetic recording medium as claimed in claim 1, wherein the mixing ratio by weight of the calcium carbonate to carbon black is in the range of 5:95 to 95:5.

8. A magnetic recording medium as claimed in claim 7, wherein the mixing ratio by weight of calcium carbonate to carbon black is in the range of 10:90 to 90:10.

9. A magnetic recording medium as claimed in claim 8, wherein the mixing ratio by weight of calcium carbonate to carbon black is in the range of 30:70 to 70:30.

10. A magnetic recording medium as claimed in claim 1, wherein the surface treated calcium carbonate contains a surface treating agent in an amount of about 0.001 to about 10 parts by weight based on 100 parts by weight of calcium carbonate.

11. A magnetic recording medium as claimed in claim 10, wherein the surface treated calcium carbonate contains a surface treating agent in an amount of 0.05 to 5 parts by weight based on 100 parts by weight of calcium carbonate.

12. A magnetic recording medium as claimed in claim 1, wherein the surface treated calcium carbonate contains a surface treating agent in an amount of 0.1 to 3 parts by weight based on 100 parts by weight of calcium carbonate.

13. A magnetic recording medium as claimed in claim 10, wherein the surface treating agent is a natural surfactant.

14. A magnetic recording medium as claimed in claim 10, wherein the surface treating agent is a nonionic surfactant.

15. A magnetic recording medium as claimed in claim 10, wherein the surface treating agent is a cationic surfactant.

16. A magnetic recording medium as claimed in claim 10, wherein the surface treating agent is an anionic surfactant.

17. A magnetic recording material as claimed in claim 10, wherein the surface treating agent is an amphoteric surfactant.

18. A magnetic recording medium as claimed in claim 13, wherein the natural surfactant is selected from the group consisting of saponin, lecithin and resin acid.

19. A magnetic recording medium as claimed in claim 18, wherein the natural surfactant is lecithin or resin acid.

20. A magnetic recording medium as claimed in claim 19, wherein the natural surfactant is resin acid.

21. A magnetic recording medium as claimed in claim 14, wherein the nonionic surfactant is selected from the group consisting of an alkylene oxide, a glycerol and a glycidol.

22. A magnetic recording medium as claimed in claim 21, wherein the nonionic surfactant is an alkylene oxide.

23. A magnetic recording medium as claimed in claim 15, wherein the cationic surfactant is selected from the group consisting of a higher alkylamine, a quaternary ammonium salt and a heterocyclic compound.

24. A magnetic recording medium as claimed in claim 23, wherein the cationic surfactant is a quaternary ammonium salt.

25. A magnetic recording medium as claimed in claim 16, wherein the anionic surfactant has an acidic group.

26. A magnetic recording medium as claimed in claim 25, wherein the acidic group is a carboxylic acid group, a sulfonic acid group, a phosphoric acid group, a sulfate group or a phosphate group.

27. A magnetic recording medium as claimed in claim 26, wherein the acidic group is a carboxylic group or a sulfonic acid group.

28. A magnetic recording medium as claimed in claim 17, wherein the amphoteric surfactant is selected from the group consisting of an amino acid, an amino sulfonic acid and a sulfate or phosphate of an amino-alcohol.

29. A magnetic recording medium as claimed in claim 28, wherein the amphoteric surfactant is an amino acid.

30. A magnetic recording medium as claimed in claim 10, wherein the surface treating agent is a high molecular weight resin having a polar group.

31. A magnetic recording medium as claimed in claim 30, the resin is a vinyl chloride-vinyl acetate copolymer having —COOH and/or —OH or nitrocellulose.

32. A magnetic recording medium as claimed in claim 31, wherein the resin is a vinyl chloride-vinyl acetate copolymer having —COOH and/or —OH.

33. A magnetic recording medium as claimed in claim 32, wherein the resin is a vinyl chloride/vinyl acetate/maleic acid copolymer.

34. A magnetic recording medium as claimed in claim 10, wherein the surface treating agent is lignin.

35. A magnetic recording medium as claimed in claim 1, wherein the amount of the calcium carbonate is about 1 to about 500 parts by weight based on 100 parts by weight of the binder.

36. A magnetic recording medium as claimed in claim 35, wherein the amount of the calcium carbonate is 5 to 200 parts by weight based on 100 parts by weight of the binder.

37. A magnetic recording medium as claimed in claim 36, wherein the amount of the calcium carbonate is 10 to 100 parts by weight based on 100 parts by weight of the binder.

38. A magnetic recording medium as claimed in claim 1, wherein the backing layer comprises a binder selected from the group consisting of a copolymer of vinyl chloride and vinyl acetate, a copolymer of vinylidene chloride and acrylonitrile, a copolymer of vinyl chloride and vinylidene chloride, a urethane elastomer, a copolymer of acrylonitrile and butadiene and a cellulose derivative.

39. A magnetic recording medium as claimed in claim 38, wherein the binder is selected from the group consisting of a copolymer of vinyl chloride and vinyl acetate, a copolymer of vinylidene chloride and acrylonitrile, a urethane elastomer and a cellulose derivative.

40. A magnetic recording medium as claimed in claim 1, wherein the carbon black and calcium carbonate are dispersed in a binder having a softening temperature of 150° C. or less, an average molecular weight in the range of 10,000 to 200,000 and a polymerization degree of about 200 to 2,000.

41. A magnetic recording medium as claimed in claim 40, wherein the binder includes a curing agent having a molecular weight of 200,000 or less.

42. A magnetic recording medium as claimed in claim 41, wherein the curing agent is selected from the group consisting of epoxy resins, polyurethane curing type resins, alkyd resins, silicone resins, acryl type reactive resins, mixtures of a high molecular weight polyester resin and an isocyanate prepolymer, mixtures of a copolymer of methacrylate and a diisocyanate prepolymer, mixtures of polyester poloyl and polyisocyanate, mixtures of a low molecular glycol/a high molecular diol/triphenyl methane triisocyanate, polyamine resins, polyisocyanates and mixtures thereof.

43. A magnetic recording medium as claimed in claim 42, wherein the curing agent is selected from the group consisting of epoxy resins, polyurethane curing type resins, alkyd resins and polyisocyanates.

44. A magnetic recording medium as claimed in claim 1, wherein the backing layer has a dry thickness of about 0.05 to about $5\mu$.

45. A magnetic recording medium as claimed in claim 44, wherein the backing layer has a dry thickness of 0.1 to $3\mu$.

46. A magnetic recording medium as claimed in claim 45, wherein the backing layer has a dry thickness of 0.2 to $2\mu$.

47. A magnetic recording medium as claimed in claim 1, wherein the calcium carbonate has an average particle size of about $10\mu$ or less, wherein the mixing ratio by weight of calcium carbonate to carbon black is in the range of 5:95 to 95:5, wherein the surface treated calcium carbonate contains a surface treating agent in an amount of about 0.001 to about 10 parts by weight based on 100 parts by weight of calcium carbonate and wherein said calcium carbonate is surface treated by contacting the same with said surface treating agent prior to forming the backing layer.

48. A magnetic recording medium as claimed in claim 47, wherein said backing layer further comprises an organic polymer binder.

49. A magnetic recording medium as claimed in claim 48, wherein said calcium carbonate is contacted with said surface treating agent by mixing the same in the presence of a solvent.

* * * * *